US007450830B2

(12) United States Patent
Ishiguchi (10) Patent No.: US 7,450,830 B2
(45) Date of Patent: Nov. 11, 2008

(54) OPTICAL DISC PLAYBACK APPARATUS (75) Inventor: Fusao Ishiguchi, Osaka (JP)

(73) Assignee: Funai Electric Co., Ltd. (JP)

( * ) Notice: Subject to any disclaimer, the term of this patent is extended or adjusted under 35 U.S.C. 154(b) by 854 days.

(21) Appl. No.: 10/941,095

(22) Filed: Sep. 15, 2004

(65) Prior Publication Data
US 2006/0044976 A1 Mar. 2, 2006

(30) Foreign Application Priority Data
Sep. 1, 2004 (JP) ............... 2004-254073

(51) Int. Cl.
H04N 5/00 (2006.01)
(52) U.S. Cl. ............... 386/126; 369/53.2; 369/47.55; 369/53.41
(58) Field of Classification Search ............... 386/126; 369/47.55, 53.2, 53.41
See application file for complete search history.

(56) References Cited
U.S. PATENT DOCUMENTS
2003/0170007 A1 * 9/2003 Namatame ............... 386/96

FOREIGN PATENT DOCUMENTS
JP 2001-28167 1/2001
JP 2002-170330 6/2002

* cited by examiner

Primary Examiner—Thai Tran
Assistant Examiner—Girumsew Wendmagegn
(74) Attorney, Agent, or Firm—Bacon & Thomas, PLLC (57) ABSTRACT An optical disc playback apparatus having DTS sound incompatible function is provided, which apparatus is capable of automatically playing back the Dolby sound without selecting the Dolby sound in the menu setting, when an optical disc including the DTS content is played back. When the playback of the optical disc including the DTS content is started, DTS compatibility judging means judges whether or not the setting function of the apparatus is set in the DTS sound compatible state. In the case when the result of judgment indicates the DTS sound incompatible state, Dolby sound selection means carries out a control in such a manner that a Dolby sound is compulsively selected, so that the Dolby sound is output instead of the DTS sound. Accordingly, a user is able to listen a comfortable sound and no operation for selecting the Dolby sound is required as for the type of sound to be listened, thereby enabling the usability to be enhanced in the operation of the apparatus.

3 Claims, 7 Drawing Sheets

FIG. 2

| TYPE OF COMPRESSED DATA FOR SOUND | SOUND IDENTIFICATION INFORMATION | |
|---|---|---|
| | STREAM ID | HIGH 5 BITS OF SUB-STRAM ID |
| LPCM | 10111101 | 10100 |
| DOLBY DIGITAL | 10111101 | 10000 |
| MPEG AUDIO | 11000*** OR 11010*** | NONE |
| DTS | 10111101 | 10001 |

OPTICAL DISC PLAYBACK APPARATUS

BACKGROUND OF THE INVENTION

The present invention relates to an optical disc playback apparatus for playing back images and sounds by reading out image and sound information recorded in an optical disc, such as a DVD (digital versatile disc) or the like. More specifically, the present invention relates to an optical disc playback apparatus having neither playback function nor outputting function for DTS (digital theater system) sound.

Traditionally, an optical disc such as a DVD or the like has compressed data for various types of sound, such as LPC (linear pulse code modulation) sound, Dolby Digital sound, MPEG (moving picture coding experts group) Audio sound and DTS sound, in a so-called multiple audio signal stream. At present, optical discs in which the DTS sound is recorded in the initial signal stream are increasingly used.

Furthermore, it is known that a certain type of an optical disc playback apparatus is not equipped with DTS decoder for playing back the DTS sound, which DTS decoder is installed in an audio decoder for playing back sound, or it is designed such that the DTS sound cannot be output, because the patent license fee for the usage of the DTS decoder is not paid.

In such an optical disc playback apparatus having neither the playback function nor the outputting function for the DTS sound, a user is usually unable to select the playback of DTS sound, wherein, in the initial setting, i.e., in default before shipping from a factory, the playback apparatus is such that a sound other than the DTS sound is automatically selected in the initial state of playback after the power supply is turned on. Accordingly, no DTS sound signal is supplied from the sound output terminal in the initial state of playback after turning on the power supply, because no compressed data for the DTS sound are supplied to an audio decoder. See, for example, Japanese Unexamined Patent Application Publication Nos. 2001-28167 and No. 2002-170330.

When, however, a user tries to playback an optical disc in which, for instance, LPCM, Dolby Digital, MPEG Audio and DTS sounds are recorded, using a conventional optical disc playback apparatus having neither playback function nor outputting function for the DTS sound, it is preset such that a sound other than the DTS sound (normally LPCM) is automatically selected in the state of playback. Therefore, no DTS sound but the LPCM sound is output, even if an optical disc including DTS content is played back. This causes the user to receive his unpleasant feeling. In the case when he wishes to output the Dolby sound, he has to carry out an operation for selecting the Dolby sound as a type of sound to be listened.

For instance, the Dolby sound is selected, either in the setting menu on the side of the apparatus or in the disc menu in the optical disc including the DTS content. In the case when the Dolby sound is selected in the disc menu, the sound to be listened changes over from DTS to Dolby, if defaulted to the DTS sound. Accordingly, a troublesome operation is required to select the Dolby sound in the conventional optical disc playback apparatus, thereby providing a somewhat inconvenient operation thereof.

In the prior art of Japanese Unexamined Patent Application Publication No. 2001-28167, the type of encoding the data, which are recorded in an optical disc, is stored, after allocating them to the content information, so that the playback of information, in particular, audio information corresponding to the type of encoding is carried out by identifying the type of encoding in the disc when the disc is loaded. In this prior art, it is found that the DTS sound is discriminated from the PCM sound. However, the Dolby sound is not described anywhere in the specification. Consequently, the above-described problems have never yet been solved.

In the prior art of Japanese Unexamined Patent Application Publication No. 2002-170330, a process is carried out for identifying whether a bit stream pertains to a PCM signal or to a DTS signal. In the specification, however, there is not any further description as for the Dolby sound. Consequently, the above-described problems have never yet been solved.

SUMMARY OF THE INVENTION

The present invention is intended to solve the above problems, and, therefore, the object of the present invention is to offer an optical disc playback apparatus having a DTS sound incompatible function, either wherein the Dolby sound can be automatically played back without selecting the Dolby sound in the menu setting when an optical disc including the DTS content is played back, or wherein a warning signal is provided if the DTS sound is selected in the disc menu when an optical disc including the DTS content is played back.

To attain the above objects, the present invention offers optical disc playback apparatuses having the following features.

In a first feature of the invention defined by claim 1, an optical disc playback apparatus comprises an optical pickup for reading out compressed data including images and sounds recorded in an optical disc; a memory means for storing a table of identification information for identifying the type of the compressed data read out by the optical pickup; a demultiplexer for separating the compressed data read out by the optical pickup into corresponding types of data on the basis of the identification information recorded in the memory means; video playback means for playing back the image data on the basis of the compressed image data separated by the demultiplexer; audio playback means for playing back the sound data on the basis of the compressed sound data separated by the demultiplexer; and a control section for controlling the optical pickup, the memory means, the video playback means and the audio playback means; wherein the identification information stored in the table includes sound identification information for identifying the type of sound data, wherein the audio playback means has various audio decoders for playing back the compressed data for various types of sound read out by the optical pickup, wherein the optical disc playback apparatus includes a function for selecting an appropriate audio decoder from the various audio decoders in accordance with the type of compressed data read out by the optical pickup, which type is identified by comparing the sound identification information included in the compressed sound data read out by the optical pickup with the sound identification information stored in the table, and wherein the control section is equipped with DTS compatibility judging means for judging whether or not the setting function of the apparatus is set in the DTS sound compatible state after starting the playback of the optical disc, and Dolby sound selection means for carrying out a control in such a manner that the Dolby sound is compulsively selected when the result of judgment indicates the DTS sound incompatible state.

In the first feature of the invention, the optical pickup reads out the compressed image and sound data recorded in the optical disc after starting the playback process. The compressed data thus read out by the optical pickup is separated into specified types of data on the basis of the identification information stored in the memory means by the demultiplexer. In the video playback means, the image data are played back on the basis of the compressed image data, and in the audio playback means, the sound data are played back on the basis of the compressed sound data. The optical pickup, memory means, video playback means and audio playback means are all controlled by the control section.

When starting the playback of the optical disc including the DTS content, it is judged whether or not the setting function of the apparatus is set in the DTS sound compatible state by the DTS compatibility judging means. When the result of judgment indicates the DTS sound compatible state, the Dolby sound is compulsively selected by the Dolby sound selection means, so that the Dolby sound is output instead of the DTS sound.

In the first feature of the invention, the optical disc playback apparatus having DTS sound incompatible function allows the Dolby sound to be automatically played back without selecting the Dolby sound in the menu setting when the optical disc including the DTS content is played back. Since, therefore, the Dolby sound is automatically played back and output instead of the DTS sound, a user is able to listen a comfortable sound. Moreover, it is unnecessary to select the Dolby sound as a type of sound to be listened, thereby enabling the usability to be enhanced in the operation of the apparatus.

In a second feature of the invention defined by claim 2, an optical disc playback apparatus includes a control section which is equipped with DTS compatibility judging means for judging whether or not the setting function of the apparatus is set in the DTS sound compatible state after starting the playback of the optical disc, and Dolby sound selection means for carrying out a control in such a manner that the Dolby sound is compulsively selected when the result of judgment indicates the DTS sound incompatible state.

In the second feature of the invention, when starting the playback of the optical disc including the DTS content, it is judged whether or not the setting function of the apparatus is set in the DTS sound compatible state by the DTS compatibility judging means. When the result of judgment indicates the DTS sound incompatible state, the Dolby sound is compulsively selected by the Dolby sound selection means, so that the Dolby sound is output instead of the DTS sound.

In the second feature of the invention, the optical disc playback apparatus having DTS sound incompatible function allows the Dolby sound to be automatically played back without selecting the Dolby sound in the menu setting, when the optical disc including the DTS content is played back. Since, therefore, the Dolby sound is automatically played back and output instead of the DTS sound, a user is able to listen a comfortable sound. Moreover, it is unnecessary to select the Dolby sound as a type of sound to be listened, thereby enabling the usability to be enhanced in the operation of the apparatus.

In a third feature of the invention defined by claim 3, an optical disc playback apparatus having the DTS sound incompatible function includes a control section which is equipped with Dolby sound selection means for carrying out a control in such a manner that the Dolby sound is compulsively selected when starting the playback of an optical disc.

In the third feature of the invention, the Dolby sound is compulsively selected, when the playback of the optical disc is started. Accordingly, this feature allows a user to listen a comfortable sound. Moreover, it is unnecessary to select the Dolby sound as a type of sound to be listened, thereby enabling the usability to be enhanced in the operation of the apparatus.

In a fourth feature of the invention defined by claim 4, an optical disc playback apparatus comprises an optical pickup for reading out compressed data including images and sounds recorded in an optical disc; a memory means for storing a table of identification information for identifying the type of the compressed data read out by the optical pickup; a demultiplexer for separating the compressed data read out by the optical pickup into corresponding types of data on the basis of the identification information recorded in the memory means; video playback means for playing back the image data on the basis of the compressed image data separated by the demultiplexer; audio playback means for playing back the sound data on the basis of the compressed sound data separated by the demultiplexer; and a control section for controlling the optical pickup, the memory means, the video playback means and the audio playback means; wherein the identification information includes sound identification information for identifying the type of sound data, wherein the audio playback means has various audio decoders for playing back the compressed data for various types of sound read out by the optical pickup, wherein the optical disc playback apparatus includes a function for selecting an appropriate audio decoder from the various audio decoders in accordance with the type of compressed data read out by the optical pickup, which type is identified by comparing the sound identification information included in the compressed sound data read out by the optical pickup with the sound identification information stored in the table, and wherein the control section is equipped with DTS compatibility judging means for judging whether or not the setting function of the apparatus is set in the DTS sound compatible state, when DTS is selected in the disc menu read out from the optical disc, after starting the playback of the optical disc, and warning signal generation means for generating a warning signal when the result of judgment indicates the DTS sound incompatible state.

In the fourth feature of the invention, compressed image and sound data recorded in the optical disc are read out by the optical pickup, when the playback is started. The demultiplexer separates the compressed data thus read out by the optical pickup into the respective types of data on the basis of the identification information stored in the memory means. In the video playback means, the image data are played back on the basis of the compressed image data, whereas, in the audio playback means, the sound data are played back on the basis of the compressed sound data. The control section controls the optical pickup, memory means, video playback means and audio playback means.

When the DTS is selected in the disc menu read out from the optical disc after starting the playback of the optical disc including the DTS content, the DTS compatibility judging means judges whether or not the setting function of the apparatus is set in the DTS sound compatible state. When the DTS sound incompatible state is indicated in the result of judgment, the warning signal generation means provides the warning signal.

In the fourth feature of the invention, when the optical disc including the DTS content is played back by the optical disc playback apparatus having the DTS sound incompatible function, and when the DTS is selected in the disc menu, the warning signal is generated. Accordingly, a user is able to understand that the optical disc playback apparatus is incompatible to the DTS sound, so that the user is unable to receive any unpleasant feeling, thereby enabling the usability to be enhanced in the operation of the apparatus.

In a fifth feature of the invention defined by claim 5, an optical disc playback apparatus includes a control section which is equipped with DTS compatibility judging means for judging whether or not the setting function of the apparatus is set in the DTS sound compatible state when DTS is selected in the disc menu read out from the optical disc, after starting the playback of the optical disc, and warning signal generation means for generating a warning signal when the result of judgment indicates the DTS sound incompatible state.

In the fifth feature of the invention, when the DTS is selected in the disc menu read out from the optical disc after starting the playback of the optical disc including the DTS content, the DTS compatibility judging means judges whether or not the setting function of the apparatus is set in the DTS sound compatible state. When the DTS sound incompatible state is indicated in the result of judgment, the warning signal generation means provides the warning signal.

In the fifth feature of the invention, when the optical disc including the DTS content is played back by the optical disc playback apparatus having the DTS sound incompatible function, and when the DTS is selected in the disc menu, the warning signal is generated. Accordingly, a user is able to understand that the optical disc playback apparatus is incompatible to the DTS sound, so that the user is unable to receive any unpleasant feeling, thereby enabling the usability to be enhanced in the operation of the apparatus.

In a sixth feature of the invention defined by claim 6, an optical disc playback apparatus having the DTS sound incompatible function includes a control section which is equipped with warning signal generation means for generating a warning signal when DTS is selected in a disc menu read out from the optical disc, after starting the playback of the optical disc.

In the sixth feature of the invention, when DTS is selected in the disc menu read out from the optical disc, the warning signal is generated. Accordingly, a user is able to understand that the optical disc playback apparatus is not compatible to the DTS sound, so that the user is unable to receive any unpleasant feeling, thereby enabling the usability to be enhanced in the operation of the apparatus.

In a seventh feature of the invention defined by claim 7, an optical disc playback apparatus having the DTS sound incompatible function according to claim 3 or claim 6 comprises an optical pickup for reading out compressed data including images and sounds recorded in an optical disc; a memory means for storing a table of identification information for identifying the type of the compressed data read out by the optical pickup; a demultiplexer for separating the compressed data read out by the optical pickup into corresponding types of data on the basis of the identification information recorded in the memory means; video playback means for playing back the image data on the basis of the compressed image data separated by the demultiplexer; audio playback means for playing back the sound data on the basis of the compressed sound data separated by the demultiplexer; and a control section for controlling the optical pickup, the memory means, the video playback means and the audio playback means; wherein the identification information stored in the table includes sound identification information for identifying the type of sound data, wherein the audio playback means has various audio decoders for playing back the compressed data for various types of sound other than DTS, which types of sound are read out by the optical pickup, wherein the optical disc playback apparatus includes a function for selecting an appropriate audio decoder from the various audio decoders in accordance with the type of compressed data read out by the optical pickup, which type is identified by comparing the sound identification information included in the compressed sound data read out by the optical pickup with the sound identification information stored in the table, and wherein the optical disc playback apparatus has no DTS decoder for playing back the DTS sound.

Accordingly, in the case when such an optical disc playback apparatus having the DTS sound incompatible function is equipped with the DTS compatibility judging means and the Dolby sound selection means, the Dolby sound is automatically selected without selecting the Dolby sound in the menu setting, when the optical disc including the DTS content is played back. Moreover, in the case when such an optical disc playback apparatus having the DTS sound incompatible function is equipped with the DTS compatibility judging means and the warning signal generation means, the warning signal is provided when the optical disc including the DTS content is played back and when the DTS is selected in the disc menu.

In an eighth feature of the invention defined by claim 8, an optical disc playback apparatus comprises an optical pickup for reading out compressed data including images and sounds recorded in an optical disc; a memory means for storing a table of identification information for identifying the type of the compressed data read out by the optical pickup; a demultiplexer for separating the compressed data read out by the optical pickup into corresponding types of data on the basis of the identification information recorded in the memory means; video playback means for playing back the image data on the basis of the compressed image data separated by the demultiplexer; audio playback means for playing back the sound data on the basis of the compressed sound data separated by the demultiplexer; and a control section for controlling the optical pickup, the memory means, the video playback means and the audio playback means; wherein the identification information stored in the table includes sound identification information for identifying the type of sound data, wherein the audio playback means has various audio decoders for playing back the compressed data for various types of sound read out by the optical pickup, wherein the optical disc playback apparatus includes a function for selecting an appropriate audio decoder from the various audio decoders in accordance with the type of compressed data read out by the optical pickup, which type is identified by comparing the sound identification information included in the compressed sound data read out by the optical pickup with the sound identification information stored in the table, and wherein the control section is equipped with DTS compatibility judging means for judging whether or not the setting function of the apparatus is set in the DTS compatible state after starting the playback of the optical disc, Dolby sound selection means for carrying out a control in such a manner that the Dolby sound is compulsively selected when the result of judgment indicates the DTS sound incompatible state, and warning signal generation means for generating a warning signal when the result of judgment indicates the DTS sound incompatible state.

In the eighth feature of the invention, when the playback process is started, the optical pickup reads out the compressed image and sound data recorded in the optical disc. Thereafter, the demultiplexer separates the compressed data thus read out by the optical pickup into the respective types of data on the basis of the identification information stored in the memory means. The video playback means plays back the image data on the basis of the compressed image data, and the audio playback means plays back the sound data on the basis of the compressed sound data. The control section controls the optical pickup, memory means, video playback means and audio playback means.

In this case, the DTS compatibility judging means judges whether or not the setting function of the apparatus is set in the DTS sound compatible state, when the playback of the optical disc including the DTS content is started. In the case when the result of judgment indicates the DTS sound incompatible state, the Dolby sound selection means carries out the control in such a manner that the Dolby sound is compulsively selected, thereby making it possible to output the Dolby sound instead of the DTS sound. Moreover, in the case when the result of judgment indicates the DTS sound incompatible state, the warning signal is provided by the warning signal generation means.

In the eighth feature of the invention, the Dolby sound is automatically played back without selecting the Dolby sound in the menu setting, when the optical disc including the DTS content is played back by the optical disc playback apparatus having the DTS sound incompatible function. Since, therefore, the Dolby sound is automatically played back and output instead of the DTS sound, a user is able to listen a comfortable sound. Moreover, no operation for selecting the Dolby sound is required as for the type of sound to be listened, thereby enabling the usability to be enhanced in the operation of the apparatus.

In the eighth feature of the invention, moreover, when the optical disc including the DTS content is played back by the optical disc playback apparatus having the DTS sound incompatible function, and when DTS is selected in the disc menu, the warning signal is generated. Accordingly, a user is able to understand that the optical disc playback apparatus is not compatible to the DTS sound, so that the user is unable to receive any unpleasant feeling, thereby enabling the usability to be enhanced in the operation of the apparatus.

In a ninth feature of the invention defined by claim 9, an optical disc playback apparatus having DTS sound incompatible function comprises an optical pickup for reading out compressed data including images and sounds recorded in an optical disc; a memory means for storing a table of identification information for identifying the type of the compressed data read out by the optical pickup; a demultiplexer for separating the compressed data read out by the optical pickup into corresponding types of data on the basis of the identification information recorded in the memory means; video playback means for playing back the image data on the basis of the compressed image data separated by the demultiplexer; audio playback means for playing back the sound data on the basis of the compressed sound data separated by the demultiplexer; and a control section for controlling the optical pickup, the memory means, the video playback means and the audio playback means; wherein the identification information stored in the table includes sound identification information for identifying the type of sound data, wherein the audio playback means has various audio decoders for playing back the compressed data for various types of sound other than DTS read out by the optical pickup, wherein the optical disc playback apparatus includes a function for selecting an appropriate audio decoder from the various audio decoders in accordance with the type of compressed data read out by the optical pickup, which type is identified by comparing the sound identification information included in the compressed sound data read out by the optical pickup with the sound identification information stored in the table, wherein the optical disc playback apparatus includes no DTS decoder for playing back the DTS sound, and wherein the control section is equipped with Dolby sound selection means for carrying out a control in such a manner that the Dolby sound is compulsively selected and/or warning signal generation means for generating a warning signal.

In the ninth feature of the invention, when the playback process is started, the optical pickup reads out the compressed image and sound data recorded in the optical disc. Thereafter, the demultiplexer separates the compressed data thus read out by the optical pickup into the respective types of data on the basis of the identification information stored in the memory means. The video playback means plays back the image data on the basis of the compressed image data, and the audio playback means plays back the sound data on the basis of the compressed sound data. The control section controls the optical pickup, memory means, video playback means and audio playback means.

In this case, the DTS compatibility judging means judges whether or not the setting function of the apparatus is set in the DTS sound compatible state, when the playback of the optical disc including the DTS content is started. In the case when the result of judgment indicates the DTS sound incompatible state, the Dolby sound selection means carries out the control in such a manner that the Dolby sound is compulsively selected, so that the Dolby sound is output instead of the DTS sound, and/or in the case when the result of judgment indicates the DTS sound incompatible state, the warning signal is provided by the warning signal generation means.

In the ninth feature of the invention, the Dolby sound is automatically played back without selecting the Dolby sound in the menu setting, when the optical disc including the DTS content is played back by the optical disc playback apparatus having the DTS sound incompatible function. Since, therefore, the Dolby sound is automatically played back and output instead of the DTS sound, a user is able to listen a comfortable sound. Moreover, no operation for selecting the Dolby sound is required as for the type of sound to be listened, thereby enabling the usability to be enhanced in the operation of the apparatus.

In the ninth feature of the invention, moreover, when the optical disc including the DTS content is played back by the optical disc playback apparatus having the DTS sound incompatible function, and when DTS is selected in the disc menu, the warning signal is generated. Accordingly, a user is able to understand that the optical disc playback apparatus is not compatible to the DTS sound, so that the user is unable to receive any unpleasant feeling, thereby enabling the usability to be enhanced in the operation of the apparatus.

In a tenth feature of the invention defined by claim 10, an optical disc playback apparatus comprises an optical pickup for reading out compressed data including images and sounds recorded in an optical disc; a memory means for storing a table of identification information for identifying the type of the compressed data read out by the optical pickup; a demultiplexer for separating the compressed data read out by the optical pickup into corresponding types of data on the basis of the identification information recorded in the memory means; video playback means for playing back the image data on the basis of the compressed image data separated by the demultiplexer; audio playback means for playing back the sound data on the basis of the compressed sound data separated by the demultiplexer; and a control section for controlling the optical pickup, the memory means, the video playback means and the audio playback means; wherein the identification information stored in the table includes sound identification information for identifying the type of sound data, wherein the audio playback means has various audio decoders for playing back the compressed data for various types of sound read out by the optical pickup, wherein the optical disc playback apparatus includes a function for selecting an appropriate audio decoder from the various audio decoders in accordance with the type of compressed data read out by the optical pickup, which type is identified by comparing the sound identification information included in the compressed sound data read out by the optical pickup with the sound identification information stored in the table, and wherein the control section is equipped with disc menu display means for displaying a disc menu on a display unit when a disc menu selection key is pushed, sound selection information storage means for storing sound selection information indicating a sound selected from the disc menu into the memory means, DTS compatibility judging means for judging whether or not the setting function of the apparatus is set in the DTS sound compatible state when the DTS sound is selected in the disc menu displayed on the display unit, warning signal generation means for generating a warning signal when the result of judgment indicates the DTS incompatible state, DTS sound selection information rewriting means for changing over from the sound selection information stored in the memory means to the sound selection information indicating the DTS sound when the result of judgment indicates the DTS sound compatible state, Dolby sound selection information rewriting means for changing over from the sound selection information stored in the memory means to the sound selection information indicating the Dolby sound when the Dolby sound is selected in the disc menu displayed on the display unit without selecting the DTS sound, LPCM sound selection information rewriting means for changing over from the sound selection information stored in the memory means to the sound selection information indicating the LPCM sound when the LPCM sound is selected in the disc menu displayed on the display unit without selecting the DTS sound, MPEG sound selection information rewriting means for changing over from the sound selection information stored in the memory means to the sound selection information indicating the MPEG sound when the MPEG sound is selected in the disc menu displayed on the display unit without selecting the DTS sound, first sound selection information existence judging means for judging whether or not there is sound selection information in the memory means when the setting function of the apparatus is the DTS sound compatible state after starting the main part playback process, first sound selection means for selecting the sound in accordance with the sound selection information stored in the memory means when it is judged that there is the sound selection information in the memory means, second sound selection information existence judging means for judging whether or not there is sound selection information in the memory means when the setting function of the apparatus is set in the DTS sound incompatible state after starting the main part playback process, sound selection judging means for judging whether or not the sound selection information stored in the memory means is the sound selection information indicating the DTS sound when it is judged that there is the sound selection information in the memory means, Dolby sound selection means for carrying out a control in such a manner that the Dolby sound is compulsively selected when it is judged that the sound selection information is the sound selection information indicating the DTS sound, second sound selection means for selecting the sound in accordance with the sound selection information stored in the memory means when it is judged that the sound selection information is not the sound selection information indicating the DTS sound, and main part playback control means for controlling the playback of the main part information either after the Dolby sound is compulsively selected, or after the sound is selected in accordance with the sound selection information stored in the memory means.

In the tenth feature of the invention, the optical pickup reads out the compressed image and sound data recorded in the optical disc. Thereafter, the demultiplexer separates the compressed data thus read out by the optical pickup into the respective types of data on the basis of the identification information stored in the memory means. The video playback means plays back the image data on the basis of the compressed image data, and the audio playback means plays back the sound data on the basis of the compressed sound data. The control section controls the optical pickup, memory means, video playback means and audio playback means.

In the process of selecting the disc menu, the disc menu is displayed on the display unit with the aid of the disc menu display means, when the disc menu selection key is pushed. The sound selection information indicating the sound selected from the disc menu is stored in the memory means with the aid of the sound selection information storage means. When the DTS sound is selected from the disc menu displayed on the display unit, the DTS compatibility judging means judges whether or not the setting function of the apparatus is set in the DTS sound compatible state. In the case when the result of judgment indicates the DTS sound incompatible state, the warning signal generation means generates a warning signal. In the case when the result of judgment indicates the DTS sound compatible state, the DTS sound selection information rewriting means rewrites the sound selection information stored in the memory means to the sound selection information indicating the DTS sound.

When the DTS sound is not selected but the Dolby sound is selected from the disc menu displayed on the display unit, the Dolby sound selection information rewriting means rewrites the sound selection information stored in the memory means to the sound selection information indicating the Dolby sound. When the DTS sound is not selected but the LPCM sound is selected from the disc menu displayed on the display unit, the LPCM sound selection information rewriting means rewrites the sound selection information stored in the memory means to the sound selection information indicating the LPCM sound. When the DTS sound is not selected but the MPEG sound is selected from the disc menu displayed on the display unit, the MPEG sound selection information rewriting means rewrites the sound selection information stored in the memory means to the sound selection information indicating the MPEG sound.

In the process of playing back the main part, when the setting function of the apparatus is set in the DTS sound compatible state after starting the playback of the main part, the first sound selection information existence judging means judges whether or not the sound selection information resides in the memory means. In the case when it is judged that the sound selection information resides in the memory means, the first sound selection means selects the sound in accordance with the sound selection information stored in the memory means.

However, when the setting function of the apparatus is not set in the DTS sound compatible state after starting the playback process of the main part, the second sound selection information existence judging means judges whether or not the sound selection information resides in the memory means. In the case when it is judged that the sound selection information resides in the memory means, the sound selection information judging means judges whether or not the sound selection information stored in the memory means is the sound selection information indicating the DTS sound. In the case when it is judged that the sound selection information is the sound selection information indicating the DTS sound, the Dolby sound selection means compulsively selects the Dolby sound.

However, when it is judged that the sound selection information is not the sound selection information indicating the DTS sound, the second sound selection means selects the sound in accordance with the sound selection information stored in the memory means. Either after the Dolby sound is compulsively selected, or after the sound is selected in accordance with the sound selection information stored in the memory means, the information of the main part is played back with the aid of the main part playback control means.

In the tenth feature of the invention, the Dolby sound is automatically played back without selecting the Dolby sound in the menu setting when the optical disc including the DTS content is played back. Since, therefore, the Dolby sound is automatically played back and output instead of the DTS sound, a user is able to listen a comfortable sound. Moreover, no operation for selecting the Dolby sound is required as for the type of sound to be listened, thereby enabling the usability to be enhanced in the operation of the apparatus.

In the tenth feature of the invention, moreover, the warning signal is provided, when the optical disc including the DTS content is played back, and further when DTS is selected in the disc menu. Accordingly, a user is able to understand that the optical disc playback apparatus is not compatible to the DTS sound, so that the user is unable to receive any unpleasant feeling, thereby enabling the usability to be enhanced in the operation of the apparatus.

Advantages Resulting from the Invention

As described above, the optical disc playback apparatus having the DTS sound incompatible function according to the invention includes the control section, which is equipped with the DTS compatibility judging means for judging whether or not the setting function of the apparatus is set in the DTS sound compatible state after starting the playback of the optical disc, and Dolby sound selection means for carrying out a control in such a manner that the Dolby sound is compulsively selected when the result of judgment indicates the DTS sound incompatible state. As a result, the Dolby sound is automatically played back without selecting the Dolby sound in the menu setting when the optical disc including the DTS content is played back. Since the Dolby sound is automatically played back and output instead of the DTS sound, a user is able to listen a comfortable sound. Moreover, no operation for selecting the Dolby sound is required as for the type of sound to be listened, thereby enabling the usability to be enhanced in the operation of the apparatus.

Furthermore, the optical disc playback apparatus having the DTS sound incompatible function according to the invention includes the control section, which is equipped with the DTS compatibility judging means for judging whether or not the setting function of the apparatus is set in the DTS sound compatible state, when DTS is selected in the disc menu read out from the optical disc, after starting the playback of the optical disc, and the warning signal generation means for generating a warning signal when the result of judgment indicates the DTS sound incompatible state. As a result, the warning signal is provided when the optical disc including the DTS content is played back and further when DTS is selected in the disc menu. Accordingly, a user is able to understand that the optical disc playback apparatus is not compatible to the DTS sound, so that the user is unable to receive any unpleasant feeling, thereby enabling the usability to be enhanced in the operation of the apparatus.

Furthermore, the optical disc playback apparatus having the DTS sound incompatible function according to the invention includes the control section, which is equipped with the Dolby sound selection means for carrying out a control in such a manner that the Dolby sound is compulsively selected after starting the playback of the optical disc. As a result, a user is able to listen a comfortable sound. Moreover, no operation for selecting the Dolby sound is required as for the type of sound to be listened, thereby enabling the usability to be enhanced in the operation of the apparatus.

Furthermore, the optical disc playback apparatus having the DTS sound incompatible function according to the invention includes the control section, which is equipped with the DTS compatibility judging means for judging whether or not the setting function of the apparatus is set in the DTS sound compatible state after starting the playback of the optical disc, the Dolby sound selection means for carrying out a control in such a manner that the Dolby sound is compulsively selected when the result of judgment indicates the DTS sound incompatible state, and the warning signal generation means for generating a warning signal when the result of judgment indicates the DTS sound incompatible state. As a result, the Dolby sound is automatically played back without selecting the Dolby sound in the menu setting when the optical disc including the DTS content is played back. Since the Dolby sound is automatically played back and output instead of the DTS sound, a user is able to listen a comfortable sound. Moreover, no operation for selecting the Dolby sound is required as for the type of sound to be listened, thereby enabling the usability to be enhanced in the operation of the apparatus. Moreover, when DTS is selected in the disc menu in playing back the optical disc including the DTS content, the warning signal is generated. Accordingly, a user is able to understand that the optical disc playback apparatus is not compatible to the DTS sound, so that the user is unable to receive any unpleasant feeling, thereby enabling the usability to be enhanced in the operation of the apparatus.

Furthermore, the optical disc playback apparatus having the DTS sound incompatible function according to the invention includes the control section, which is equipped with the DTS compatibility judging means for judging whether or not the setting function of the apparatus is set in the DTS sound compatible state after starting the playback of the optical disc, the Dolby sound selection means for carrying out a control in such a manner that the Dolby sound is compulsively selected when the result of judgment indicates the DTS sound incompatible state, and the warning signal generation means for generating a warning signal when the result of judgment indicates the DTS sound incompatible state. As a result, the Dolby sound is automatically played back without selecting the Dolby sound in the menu setting when the optical disc including the DTS content is played back. Since, therefore, the Dolby sound is automatically played back and output instead of the DTS sound, a user is able to listen a comfortable sound. Moreover, no operation for selecting the Dolby sound is required as for the type of the sound to be listened, thereby enabling the usability to be enhanced in the operation of the apparatus. Moreover, when DTS is selected in the disc menu in playing back the optical disc including the DTS content, the warning signal is generated. Accordingly, a user is able to understand that the optical disc playback apparatus is not compatible to the DTS sound, so that the user is unable to receive any unpleasant feeling, thereby enabling the usability to be enhanced in the operation of the apparatus.

Furthermore, the optical disc playback apparatus having the DTS sound incompatible function according to the invention includes the control section, which is equipped with the warning signal generation means for generating a warning signal when DTS is selected in the disc menu read out from the optical disc after starting the playback of the optical disc. Accordingly, a user is able to understand that the optical disc playback apparatus is not compatible to the DTS sound, so that the user is unable to receive any unpleasant feeling, thereby enabling the usability to be enhanced in the operation of the apparatus.

Furthermore, the optical disc playback apparatus having the DTS incompatible function according to the invention includes the control section, which is equipped with the Dolby sound selection means for carrying out the control in such a manner that the Dolby sound is compulsively selected and/or the warning signal generation means for generating a warning signal. As a result, the Dolby sound is automatically played back without selecting the Dolby sound in the menu setting when the optical disc including the DTS content is played back. Since the Dolby sound is automatically played back and output instead of the DTS sound, a user is able to listen a comfortable sound. Moreover, no operation for selecting the Dolby sound is required as for the type of sound to be listened, thereby enabling the usability to be enhanced in the operation of the apparatus. When, moreover, DTS is selected in the disc menu in playing back the optical disc including the DTS content, a warning signal is generated. Accordingly, a user is able to understand that the optical disc playback apparatus is not compatible to the DTS sound, so that the user is unable to receive any unpleasant feeling, thereby enabling the usability to be enhanced in the operation of the apparatus.

Furthermore, the optical disc playback apparatus having the DTS incompatible function according to the invention includes the control section, which is equipped with the Dolby sound selection means for carrying out the control in such a manner that the Dolby sound is compulsively selected and/or the warning signal generation means for generating a warning signal. As a result, the Dolby sound is automatically played back without selecting the Dolby sound in the menu setting when the optical disc including the DTS content is played back. Since the Dolby sound is automatically played back and output instead of the DTS sound, a user is able to listen a comfortable sound. Moreover, no operation for selecting the Dolby sound is required as for the type of sound to be listened, thereby enabling the usability to be enhanced in the operation of the apparatus. When, moreover, DTS is selected in the disc menu in playing back the optical disc including the DTS content, a warning signal is generated. Accordingly, a user is able to understand that the optical disc playback apparatus is not compatible to the DTS sound, so that the user is unable to receive any unpleasant feeling, thereby enabling the usability to be enhanced in the operation of the apparatus.

Furthermore, the optical disc playback apparatus having the DTS incompatible function according to the invention includes the control section, which is equipped with the disc menu display means for displaying a disc menu on a display unit when a disc menu selection key is pushed, sound selection information storage means for storing sound selection information indicating a sound selected from the disc menu into the memory means, DTS compatibility judging means for judging whether or not the setting function of the apparatus is set in the DTS sound compatible state when the DTS sound is selected in the disc menu displayed on the display unit, warning signal generation means for generating a warning signal when the result of judgment indicates the DTS incompatible state, DTS sound selection information rewriting means for changing over from the sound selection information stored in the memory means to the sound selection information indicating the DTS sound when the result of judgment indicates the DTS sound incompatible state, Dolby sound selection information rewriting means for changing over from the sound selection information stored in the memory means to the sound selection information indicating the Dolby sound when the Dolby sound is selected in the disc menu displayed on the display unit without selecting the DTS sound, LPCM sound selection information rewriting means for changing over from the sound selection information stored in the memory means to the sound selection information indicating the LPCM sound when the LPCM sound is selected in the disc menu displayed on the display unit without selecting the DTS sound, MPEG sound selection information rewriting means for changing over from the sound selection information stored in the memory means to the sound selection information indicating the MPEG sound when the MPEG sound is selected in the disc menu displayed on the display unit without selecting the DTS sound, first sound selection information existence judging means for judging whether or not there is sound selection information in the memory means when the setting function of the apparatus is the DTS sound compatible after starting the main part playback process, first sound selection means for selecting the sound in accordance with the sound selection information stored in the memory means when it is judged that there is the sound selection information in the memory means, second sound selection information existence judging means for judging whether or not there is sound selection information in the memory means when the setting function of the apparatus is not the DTS sound compatible after starting the main part playback process, sound selection judging means for judging whether or not the sound selection information stored in the memory means is the sound selection information indicating the DTS sound when it is judged that there is the sound selection information in the memory means, Dolby sound selection means for carrying out a control in such a manner that the Dolby sound is compulsively selected when it is judged that the sound selection information is the sound selection information indicating the DTS sound, second sound selection means for selecting the sound in accordance with the sound selection information stored in the memory means when it is judged that the sound selection information is not the sound selection information indicating the DTS sound, and main part playback control means for controlling the playback of the main part information either after the Dolby sound is compulsively selected, or after the sound is selected in accordance with the sound selection information stored in the memory means. As a result, the Dolby sound is automatically played back without selecting the Dolby sound in the menu setting when the optical disc including the DTS content is played back. Since the Dolby sound is automatically played back and output instead of the DTS sound, a user is able to listen a comfortable sound. Moreover, no operation for selecting the Dolby sound is required as for the type of sound to be listened, thereby enabling the usability to be enhanced in the operation of the apparatus. When, moreover, DTS is selected in the disc menu in playing back the optical disc including the DTS content, a warning signal is generated. Accordingly, a user is able to understand that the optical disc playback apparatus is not compatible to the DTS sound, so that the user is unable to receive any unpleasant feeling, thereby enabling the usability to be enhanced in the operation of the apparatus.

DESCRIPTION OF THE PREFERRED EMBODIMENTS

Figure 1:
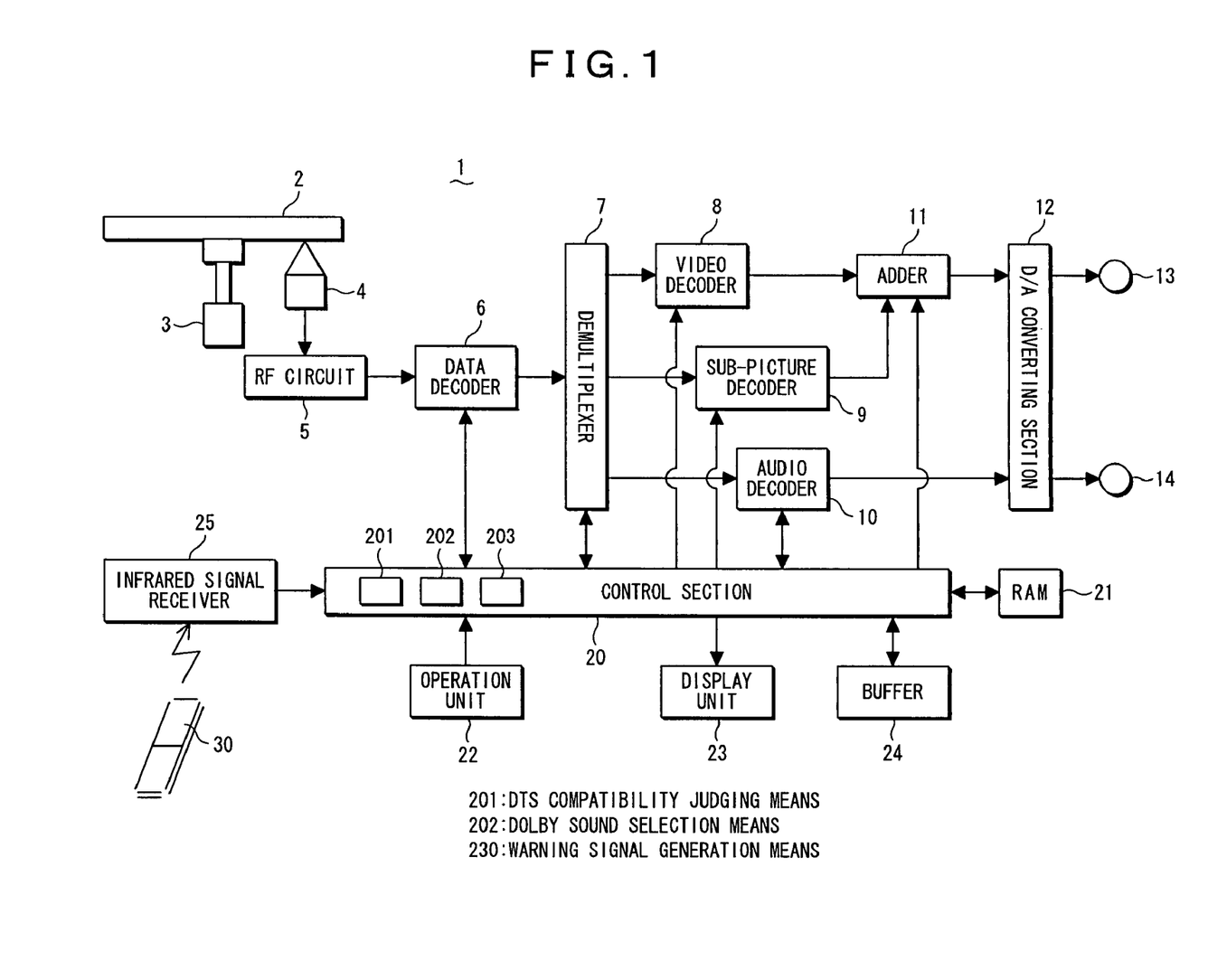
FIG. 1 is a block diagram showing the structural feature of an optical disc playback apparatus according to first and second embodiments of the invention.

Referring now to the accompanying drawings, the preferred embodiments of the present invention will be described. FIG. 1 is a block diagram showing the structural feature of an optical disc playback apparatus according to a first embodiment of the invention. An optical disc playback apparatus 1 is used as a device having no decoder for playing back the DTS sound, wherein the compressed image and sound data recorded in a DVD 2 as an optical disc are read out to play back the corresponding images and sounds, and then the images and sounds thus played back are output therefrom.

The optical disc playback apparatus 1 includes a spindle motor 3 for rotating the DVD 2 mounted onto a tray, an optical pickup 4 for supplying information recorded in the DVD 2 in the form of an RF signal, an RF circuit 5 for digitizing the RF signal supplied from the optical pickup 4, and a data decoder 6 for decoding the data digitized in the RF circuit 5 together with applying the demodulation and error corrections to the data. Moreover, the optical disc playback apparatus 1 includes a demultiplexer 7 for separating the data decoded in the data decoder 6 into compressed main image compressed data, compressed sub image data and compressed data for various types of sound, a video decoder 8 for decoding the compressed main image data, a sub-picture decoder 9 for decoding the compressed sub-image data to playback subtitles and others, and an audio decoder 10 for decoding the compressed data for the various types of sound.

An adder 11 is used to synthesize the main image data supplied from the video decoder 8 and sub-image data, such as subtitles and others supplied from the sub-picture decoder 9. Furthermore, a D/A converting process section 12 is used to convert the image data synthesized in the adder 11 and the sound data decoded in the audio decoder 10 into corresponding analog signals. Finally, the video signal and audio signal from the D/A converting section 12 are supplied to the outside via a video output terminal 13 and an audio output terminal 14, respectively.

Moreover, the optical disc playback apparatus 1 includes a control section 20 for controlling all active elements in the apparatus and a remote controller 30 for instructing the execution or stop of playback to the main body of the apparatus and for carrying out the setting of various functions. The control section 20 is connected to the spindle motor 3, RF circuit 5, data decoder 6, demultiplexer 7, video decoder 8, sub-picture decoder 9, audio decoder 10 and the adder 11. Moreover, the control section 20 is connected to a RAM 21 for storing various setting data and others, an operation unit 22 for providing various instructions to the apparatus, a display unit 23 for displaying various messages, a buffer 24 for temporarily storing data about the resume information and others, and an infrared signal receiver 25 for receiving an infrared signal supplied from the remote controller 30.

Figure 2:
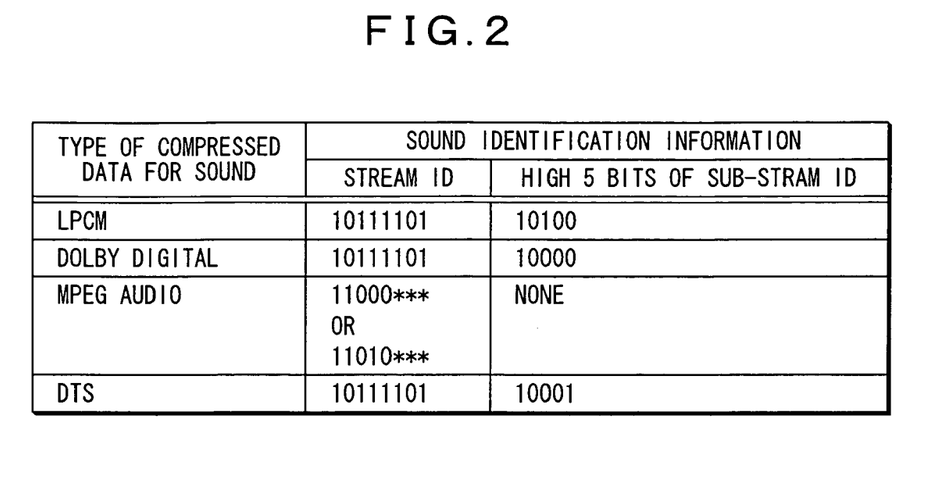
FIG. 2 is a table showing the content of identification information as for the compressed data of sound stored in a RAM of the optical disc playback apparatus according to the first and second embodiments.

In the RAM 21, a table of identification information about the compressed main image data, compressed sub-image data and compressed data for various types of sound is stored. In this case, the identification information about the compressed sound data is constituted by high five bits of both a stream ID and sub-stream ID. In the table, not only the identification information about the LPCM sound, Dolby Digital sound and MPEG Audio sound, but also the identification information about the DTS sound is stored.

When the playback is instructed by a user, the control section 20 reads the identification information in the table from the RAM 21 to supply it to the demultiplexer 7, and further transfers an identification information about a specific type of compressed sound data selected under predetermined conditions to the demultiplexer 7. On the basis of the identification information, the demultiplexer 7 separates the compressed data from the data decoder 6 into the compressed main image data, compressed sub-image data and compressed sound data, and further extracts the compressed sound data having the specific type of identification information from the compressed sound data. The compressed main image data and compressed sub-image data, which are thus separated, are supplied to the video decoder 8 and the sub-picture decoder 9, respectively. In conjunction with this, the compressed sound data thus extracted is supplied to the audio decoder 10.

Moreover, the control section 20 is equipped with DTS sound compatibility judging means 201 for judging as to whether or not a setting function of the apparatus is set in the DTS sound compatible state when the playback of the DVD 2 is started, and Dolby sound selection means 202 for carrying out a control in such a manner that the Dolby sound is compulsively selected, when the result of judgment indicates that the apparatus has the DTS sound incompatible function. The DTS sound compatibility judging means 201 and Dolby sound selection means 202 installed in the control section 20 allow the Dolby sound to be automatically played back without selecting the Dolby sound in the menu setting when the DVD 2 including the DTS content is played back by the optical disc playback apparatus 1 having the DTS sound incompatible function. As a result, a user is able to listen a comfortable sound, since the Dolby sound is output instead of the DTS sound. In addition, there is no need to carry out the operation of selecting the Dolby sound as a type of sound to be listened, thereby enabling the usability to be enhanced in the operation of the apparatus.

Furthermore, the control section 20 is equipped with warning signal generation means 203 for providing a warning signal, when the result of judgment in the DTS sound compatibility judging means 201 indicates that the apparatus is in the DTS sound incompatible state. The DTS sound compatibility judging means 201 and warning signal generation means 203 installed in the control section 20 allow a warning signal to be generated when the DVD 2 including the DTS content is played back by the optical disc playback apparatus 1 having the DTS sound incompatible function, and then DTS is selected in the disc menu. As a result, a user is able to understand that the optical disc playback apparatus is in the DTS sound incompatible state, and he is unable to receive any unpleasant feeling, thereby enabling the usability to be enhanced in the operation of the apparatus.

In order to realize such a function, in a more detailed description, the control section 20 is equipped with disc menu display means (not shown) for displaying the disc menu on the display unit 23 when a disc menu selection key is pushed, sound selection information storage means (not shown) for storing in the RAM 21 sound selection information indicating the sound which is selected in the disc menu, DTS sound compatibility judging means 201 for judging as to whether or not the setting function of the apparatus is set in the DTS sound compatible state when the DTS sound is selected from the disc menu displayed on the display unit 23, warning signal generation means 203 for providing a warning signal, when the result of judgment indicates that the apparatus is in the DTS sound incompatible state, and DTS sound selection information rewriting means (not shown) for changing over from the sound selection information stored in the RAM 21 to the sound selection information indicating the DTS sound when the result of judgment indicates that the apparatus is in the DTS sound compatible state.

Moreover, the control section 20 is equipped with Dolby sound selection information rewriting means (not shown) for changing over from the sound selection information stored in the RAM 21 to the sound selection information indicating the Dolby sound when the Dolby sound is selected without selecting the DTS sound in the disc menu displayed on the display unit 23, LPCM sound selection information rewriting means (not shown) for changing over from the sound selection information stored in the RAM 21 to the sound selection information indicating the LPCM sound when the LCPM sound is selected without selecting the DTS sound in the disc menu displayed on the display unit 23, and MPEG sound selection information rewriting means (not shown) for changing over from the sound selection information stored in the RAM 21 to the sound selection information indicating the MPEG sound when the MPEG sound is selected without selecting the DTS sound in the disc menu displayed on the display unit 23.

Moreover, the control section 20 is equipped with first sound selection information existence judging means (not shown) for judging whether or not the sound selection information exists in the RAM 21, when the setting function of the apparatus is set in the DTS sound compatible state after starting the process of playing back the main part, first sound selection means (not shown) for selecting the sound in accordance with the sound selection information stored in the memory means when it is judged that the sound selection information is stored in the RAM 21, second sound selection information existence judging means (not shown) for judging whether or not the sound selection information exists in the RAM 21, when the setting function of the apparatus is set in the DTS sound compatible state after starting the process of playing back the main part, sound selection information judging means (not shown) for judging whether or not the sound selection information stored in the RAM 21 is the sound selection information indicating the DTS sound when it is judged that the sound selection information is in the RAM 21, the above-mentioned Dolby sound selection means 202 for controlling so as to compulsively select the Dolby sound, when it is judged that the sound selection information is the sound selection information indicating the DTS sound, second sound selection means (not shown) for selecting the sound in accordance with the sound selection information stored in the RAM 21 when it is judged that the sound selection information is not the sound selection information indicating the DTS sound, and main part playback control means (not shown) for carrying out a control in such a manner that the main part is played back, either after the Dolby sound is compulsively selected or after the sound is selected in accordance with the sound selection information stored in the RAM 21.

Figure 3:
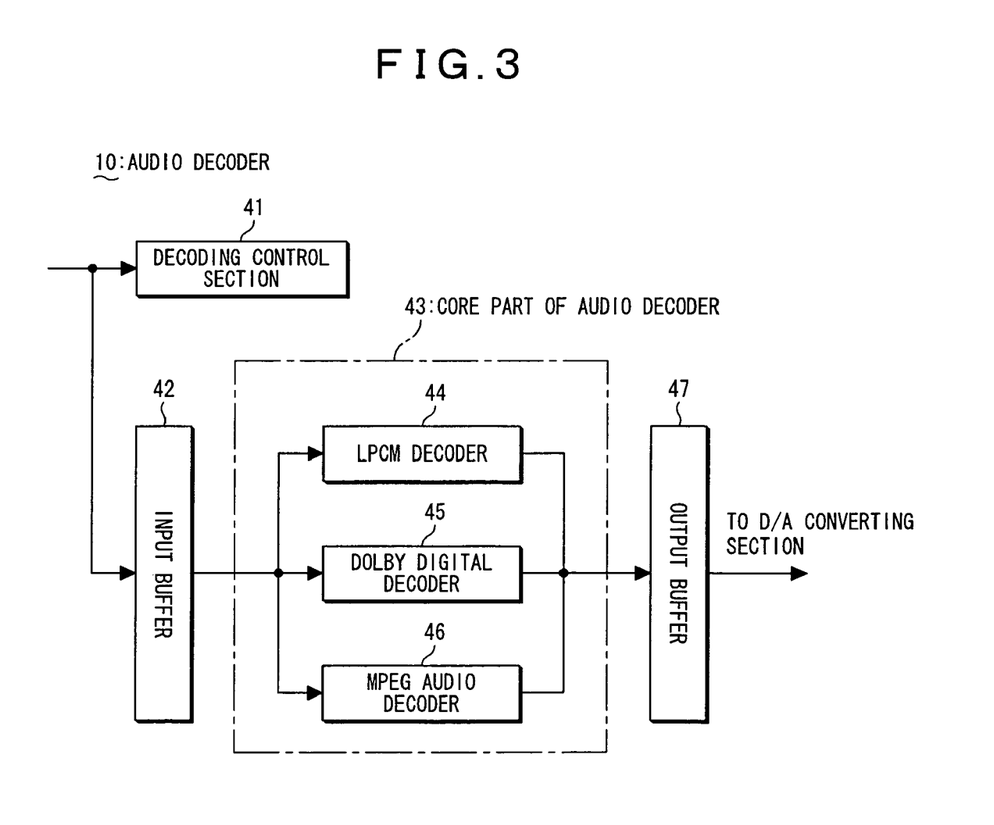
FIG. 3 is a block diagram showing substantial parts of an audio decoder in the optical disc playback apparatus according to the first and second embodiments.

FIG. 3 is a block diagram showing the substantial parts of the audio decoder 10 in FIG. 1. The audio decoder 10 comprises a decoding control section 41 for controlling all of the functions in the audio decoder 10, using additional data included in the compressed sound data supplied from the demultiplexer 7 (see FIG. 1), an input buffer 42 for temporarily storing compressed sound data from the demultiplexer 7, an audio decoder core section 43 for playing back the sound data on the basis of the compressed sound data from the input buffer 42, and an output buffer 47 for temporarily storing the sound data in the form of a digital signal to be output to the D/A converting section 12.

Moreover, the audio decoder core section 43 includes an LPCM sound decoder (LPCM decoder) 44, a Dolby digital sound decoder (Dolby digital decoder) 45 and an MPEG audio decoder (MPEG audio decoder) 46, so that the type of the compressed sound data is identified, referring to the high five bits of the stream ID (see 56 in FIG. 4) and the sub-stream ID (see 53 in FIG. 4) included in the compressed sound data from the demultiplexer 7, and the sound decoder to be used is selected in accordance with the type of compressed sound data thus identified. Thereafter, the extension and demodulation of the compressed sound data supplied from the input buffer 42 are carried out, using the selected sound decoder. In the case when the optical disc playback apparatus has a playback function for the DTS sound, there exists a DTS decoder in the audio decoder core section 43, which is shown in FIG. 3, although the DTS decoder is not shown therein. Therefore, when the optical disc playback apparatus, which has the DTS sound compatible function, is used, the DTS decoder is used to playback an optical disc including the DTS content. However, when the optical disc playback apparatus, which has the DTS sound incompatible function, is used, the DTS decoder is not used to playback an optical disc including the DTS content.

Figure 4:
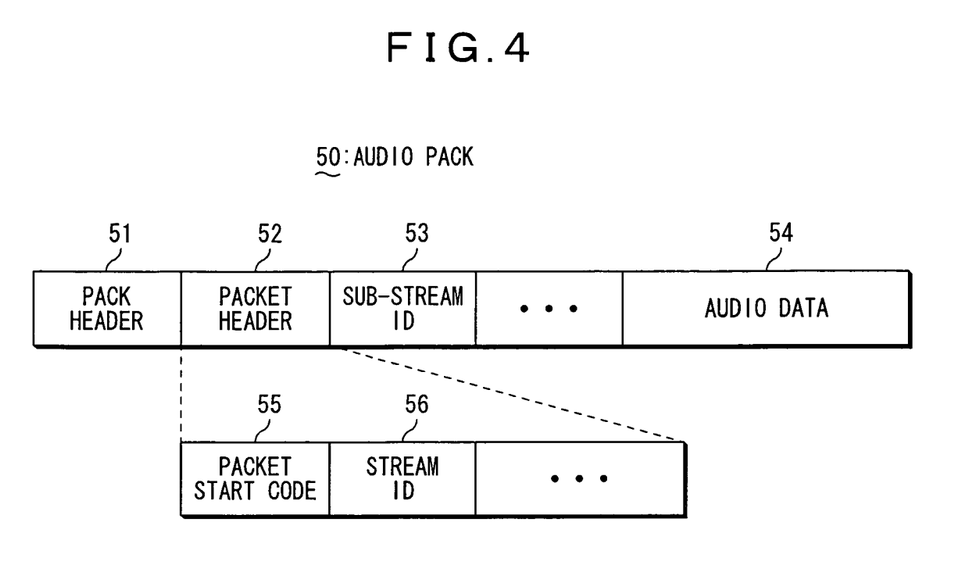
FIG. 4 is a diagram representing the recorded status of an audio pack in a DVD as a subject matter to be read in the optical disc playback apparatus according to the first and second embodiments.

Referring now to FIG. 4, the contents of the stream ID and the sub-stream ID in the compressed sound data will be described. FIG. 4 shows the bit arrangement of an audio pack in the DVD 2. The compressed sound data, which are supplied from the data decoder 6 to the demultiplexer 7, are formed either by coupling such audio packs 50 to each other or by a single audio pack 50. The audio pack 50 includes a pack header 51, packet header 52, sub-stream ID 53, audio data 54 and others.

A pack start code, reference value for the time standard in the system and others are included in the pack header 51, and a packet start code 55, stream ID 56 and others are included in the packet header 52. The stream ID 56 and sub-stream ID 53 are included in the compressed sound data, which are supplied from the data decoder 6 to the demultiplexer 7. The demultiplexer 7 extracts a specific type of compressed sound data from various types of compressed sound data, referring to the high five bits of the stream ID 56 and the sub-stream ID 53, and then supplies the compressed sound data thus extracted to the audio decoder 10.

Figure 5:
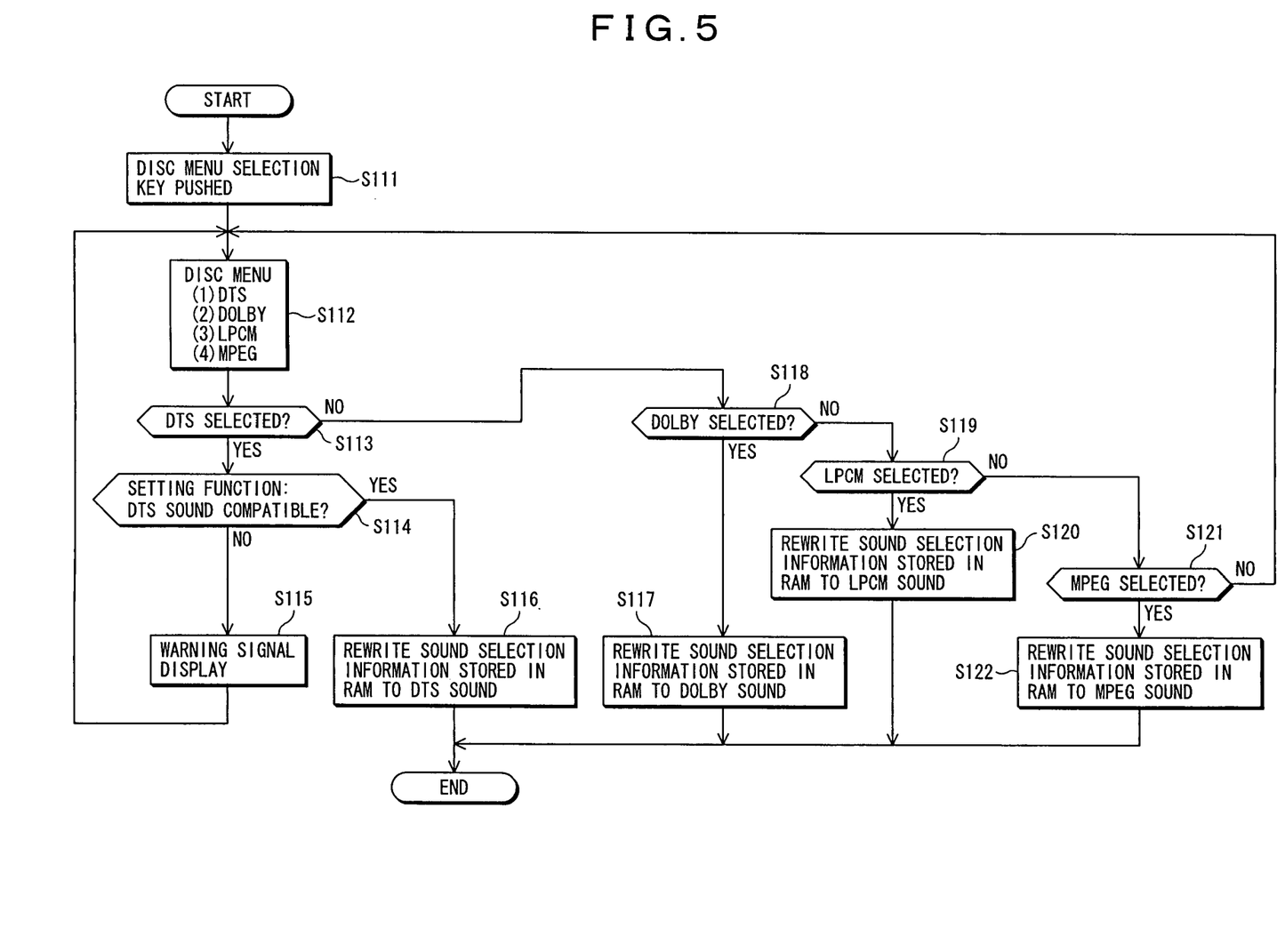
FIG. 5 is a flow chart for explaining the process of disc menus selection in the optical disc playback apparatus according to the first embodiment.

FIG. 5 is a flow chart for explaining the disc menu selection process in the optical disc playback apparatus 1 according to the first embodiment. Referring to the flow chart, the disc menu selection will be described. In this case, the optical disc playback apparatus 1 has the DTS sound incompatible function, and the optical disc to be played back is the DVD 2 including the DTS content.

When the DVD 2 is inserted into the optical disc playback apparatus 1 and further when the disc menu selection key in the operation unit 22 is pushed (step S111), the process of displaying the disc menu is started, and the disc menu is displayed on the display unit 23 (step S112). Subsequently, when the DTS sound is selected (step S113), the DTS sound compatibility judging means 201 in the control section 20 judges the sound information in the DVD 2. When it is identified from the sound information that the sound in the DVD 2 is the DTS sound, it is judged whether or not the setting function of the apparatus is compatible to the DTS sound (step S114). The judgment of the DTS sound compatibility is carried out by identifying whether an inner program stored in a ROM (not shown) connected to the control section 20 in the optical disc playback apparatus indicates the existence of DTS sound or non-existence thereof.

When it is recognized from the result of judgment that the setting function is set in the DTS sound incompatible state, the warning signal generation means 203 in the control section 20 provides a warning signal display, such as, for instance, "the apparatus is incompatible to the DTS sound" on the display unit 23 (step S115).

In spite of such a warning signal display, it is also possible to give a warning signal either with an illumination light or with a sound, such as a sound message "the apparatus is not compatible to the DTS sound". In the case when the warning signal is given, it is useful to insert a passage "the apparatus is in the DTS sound incompatible state" into the instruction manual.

In the case when the result of judgment indicates that the apparatus is compatible to the DTS sound (step S114), the DTS sound selection information rewriting means overwrites the sound selection information indicating the DTS sound on the sound selection information stored in the RAM 21 (step S116). When the Dolby sound is selected without selecting the DTS sound in the disc menu displayed on the display unit 23 (step S118), the sound selection information stored in the RAM 21 is rewritten into the sound selection information indicating the Dolby sound by the Dolby sound selection information rewriting means (step S117).

In the case when the DTS sound is not selected but the LPCM sound is selected from the disc menu displayed on the display unit 23 (step S119), the sound selection information stored in the RAM 21 is rewritten into the sound selection information indicating the LPCM sound by the LPCM sound selection information rewriting means (step S120). In the case when the DTS sound is not selected but the MPEG sound is selected from the disc menu displayed on the display unit 23 (step S121), the sound selection information stored in the RAM 21 is rewritten into the sound selection information indicating the MPEG sound by the MPEG sound selection information rewriting means (step S122).

Figure 6:
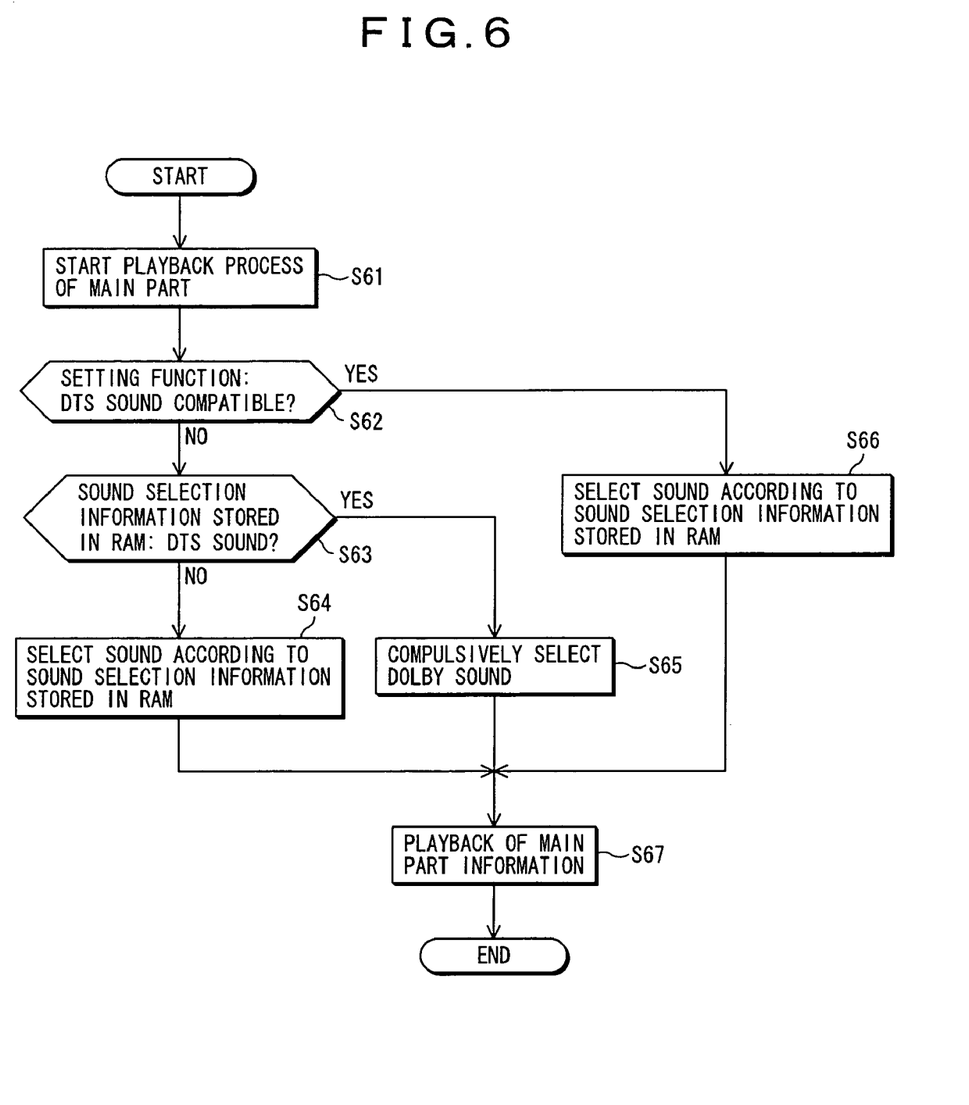
FIG. 6 is a flow chart for explaining the process of sound selection in the optical disc playback apparatus according to the first embodiment.

FIG. 6 is a flow chart for explaining the sound selection process in the optical disc playback apparatus 1 according to the first embodiment. Referring now to the flow chart, the sound selection process will be described.

When the process of playing back the main part is started (step S61) and when the setting function of the apparatus is set in the DTS sound compatible state (step S62), the sound is selected in accordance with the sound selection information stored in the RAM 21 by the first sound selection means (step S66).

On the contrary, when the process of playing back the main part is started (step S61) and when the setting function of the apparatus is set in the DTS sound incompatible state (step S62), it is judged by the sound selection information identifying means whether or not the sound selection information stored in the RAM 21 is the sound selection information indicating the DTS sound (step S63).

In the case when it is judged that the sound selection information is the sound selection information indicating the DTS sound, the Dolby sound is compulsively selected by the Dolby sound selection means (step S65). In the case when it is judged that the sound selection information is not the sound selection information indicating the DTS sound, the sound is selected in accordance with the sound selection information stored in the RAM 21 by the second sound selection means (step S64).

In the case when the setting function is set in the DTS sound compatible state (step S62), the sound is selected in accordance with the sound selection information stored in the RAM 21 (step S66).

Accordingly, the main part information is played back by the control of the main part playback control means, either after the Dolby sound is compulsively selected or after the sound is selected in accordance with the sound selection information stored in the RAM 21 (step S67).

Figure 7:
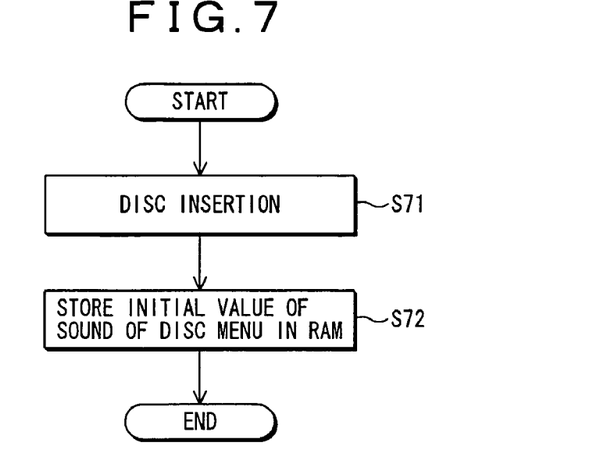
FIG. 7 is a flow chart for explaining the process of storing a default of sound from a DVD in the first embodiment.

FIG. 7 is a flow chart for explaining the process of storing the initial value or default of the sound from the DVD. As shown in the flow chart, when the DVD 2 is inserted into the optical disc playback apparatus 1 (step S71), the initial value of the sound in the disc menu is stored in the RAM 21 (step S72). In this case, the initial value of the sound implies the value used for selecting one of the DTS sound, Dolby sound, LPCM sound and MPEG sound. When a user selects no such a sound, the initial value for the sound taken out from the DVD 2, which is inserted in the optical disc playback apparatus 1, is selected, and the sound thus selected is output therefrom.

The procedures, as described above referring to FIGS. 5-7, allow the Dolby sound to be automatically played back without selecting the Dolby sound in the menu setting, when a DVD including the DTS content is played back. Since the Dolby sound is automatically played back and output instead of the DTS sound, a user is able to listen a comfortable sound, and any further procedures to select the Dolby sound as for the type of sound to be listened are not required, thereby enabling the usability to be enhanced in the operation of the apparatus.

Furthermore, the playback of a DVD including the DTS content provides a warning signal when the DTS is selected in the disc menu. Accordingly, a user is able to understand that the optical disc playback apparatus 1 is not compatible to the DTS sound, and therefore he is unable to receive any unpleasant feeling, thereby enabling the usability to be enhanced in the operation of the apparatus.

Figure 8:
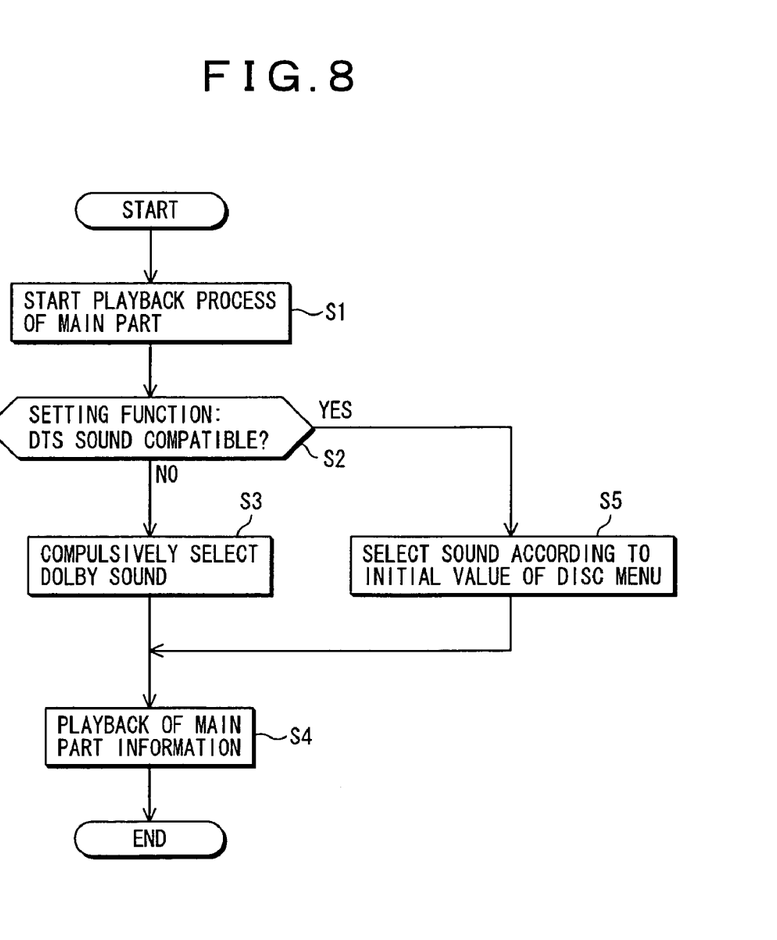
FIG. 8 is a flow chart for explaining the process of sound selection in the optical disc playback apparatus according to the second embodiment of the invention.

FIG. 8 is a flow chart for explaining the sound selection process in an optical disc playback apparatus according to the second embodiment of the invention. The structural feature of the optical disc playback apparatus in the second embodiment is the same as that in the first embodiment. Referring now to the flow chart, the sound selection process in the second embodiment will be described.

In this case, it is assumed that the optical disc playback apparatus 1 is not compatible to the DTS sound and the optical disc is the same as a DVD 2 including the DTS content.

The playback of the main part is started when the playback key in the operation unit 22 is pushed after the DVD 2 is loaded onto the optical disc playback apparatus 1 (step S1). Then, the DTS compatibility judging means 201 in the control section 20 identifies the sound information in the DVD 2, and when it is identified from the sound information that the sound in the DVD 2 is the DTS sound, it is judged whether or not the setting function of the apparatus is set in the DTS sound compatible state (step S2). When it is recognized from the result of judgment that the setting function is set in the DTS sound incompatible state, the Dolby sound selection means 202 in the control section 20 allows the Dolby sound to be compulsively selected (step S3).

In other words, the Dolby sound selection means 202 in the control section 20 allows the Dolby digital decoder 45 to be selectively driven in the audio decoder 10, thereby enabling the Dolby sound to be compulsively selected. Thereafter, the information in the main part is played back (step S4). In the playback of the main part information, the sound is played back in the Dolby sound.

In the case when the DVD 2 is played back by the optical disc playback apparatus 1 having the DTS compatible function, the process flow transfers from the step S2 to the step S5, and the sound is selected in accordance with the initial value in the disc menu displayed on the display unit, because the setting function is set in the DTS sound compatible state. In this case, the initial value in the disc menu is set into the DTS sound, so that the DTS sound is played back.

With the above procedures, the Dolby sound can be automatically played back in the playback of the DVD 2 including the DTS content without selecting the Dolby sound in the menu setting. Since the Dolby sound is output instead of the DTS sound, a user is able to listen a comfortable sound, and any further procedures to select the Dolby sound as for the type of sound to be listened are not required, thereby enabling the usability to be enhanced in the operation of the apparatus.

Figure 9:
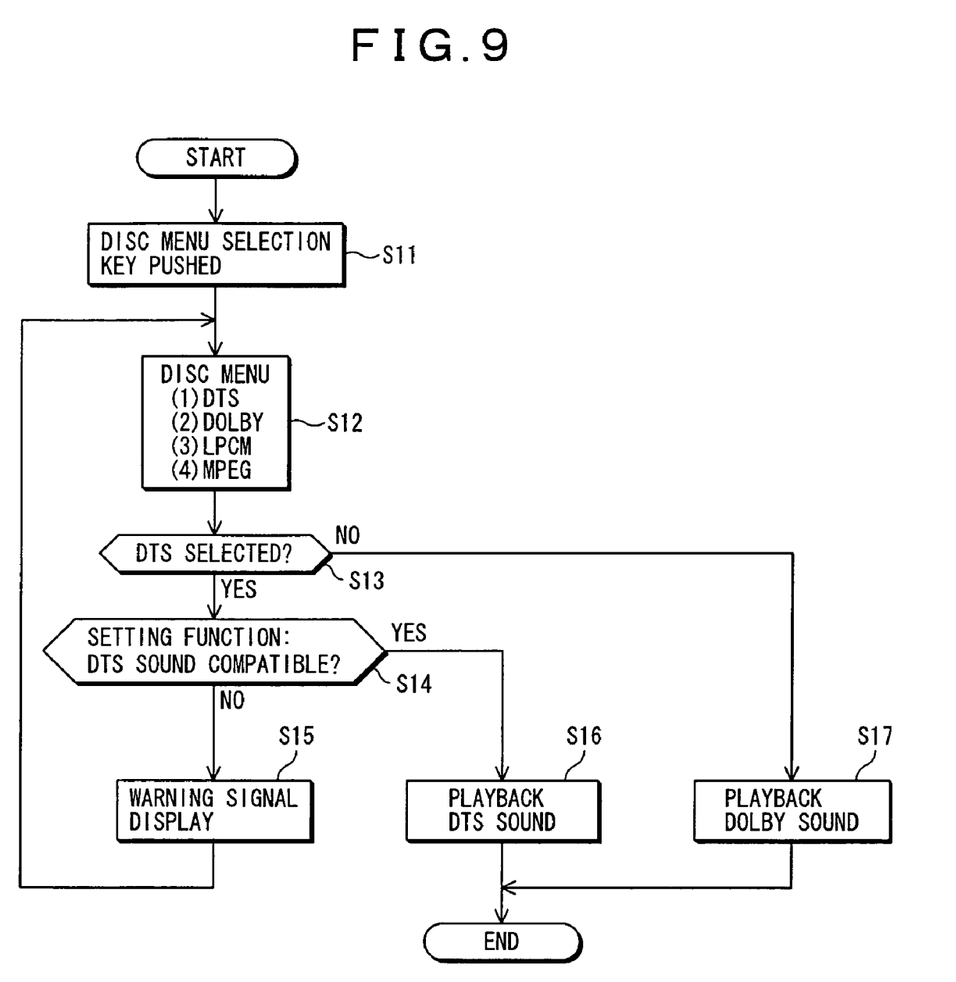
FIG. 9 is a flow chart for explaining the process of generating a warning signal in the optical disc playback apparatus of the second embodiment.

FIG. 9 is a flow chart for explaining the warning signal generation process in the optical disc playback apparatus in the second embodiment. Referring to the flow chart, the warning signal generation process will be described. In this case, it is also assumed that the optical disc playback apparatus 1 is not compatible to the DTS sound, and the optical disc to be played back is the same as a DVD 2 including the DTS content.

When the disc menu selection key in the operation unit 22 is pushed after the DVD 2 is inserted into the optical disc playback apparatus 1 (step S11), a playback process (a pretreating process before the playback of the main part information) is started and a disc menu is displayed on the display unit 23 (step S12). Subsequently, when the DTS sound is selected (step S13), DTS sound compatibility judging means 201 in the control section 20 allows the sound information in the DVD 2 to be identified. When, from the sound information, it is recognized that the sound in the DVD 2 corresponds to the DTS sound, it is judged whether or not the setting function of the apparatus is set in the DTS sound compatible state (step S14).

However, when, from the result of judgment, it is recognized that the setting function is set in the DTS sound incompatible state, the warning signal generation means 203 in the control section 20 provides a warning signal display, such as for instance, "the apparatus is not compatible to the DTS sound" on the display unit 23 (step S15).

In spite of such a warning signal display, it is also possible to give a warning signal either with an illumination light or with a sound, such as a sound message "the apparatus is not compatible to the DTS sound". In the case when the warning signal is given, it is effective to insert a passage "the apparatus has no DTS sound compatible function" into the instruction manual.

When, under such a warning signal condition, a user selects the Dolby sound in the disc menu, the process flow transfers from the step S13 to the step S17 (after carrying out the process shown in FIG. 8), and then the optical disc playback apparatus 1 plays back the Dolby sound (step S17). However, when the DVD 2 is played back by the optical disc playback apparatus 1 having the DTS sound compatible function, the process flow transfers from the step S14 to the step S16 (after carrying out the process shown in FIG. 8) and the DTS sound is played back, because the setting function is set in the DTS sound compatible state.

In the case when the DVD 2 including the DTS content is played back in the optical disc playback apparatus having the DTS sound incompatible function, the selection of the DTS in the disc menu with the above process provides a warning signal. Accordingly, a user is able to understand that the optical disc playback apparatus is not compatible to the DTS sound, and therefore he does not receive any unpleasant feeling, thereby enabling the usability to be enhanced in the operation of the apparatus.

What is claimed is:

1. An optical disc playback apparatus comprising:
   an optical pickup for reading out compressed data including images and sounds recorded in an optical disc;
   a memory means for storing a table of identification information for identifying the type of the compressed data read out by said optical pickup;
   a demultiplexer for separating the compressed data read out by said optical pickup into corresponding types of data on the basis of the identification information recorded in said memory means;
   video playback means for playing back the image data on the basis of the compressed image data separated by said demultiplexer;
   audio playback means for playing back the sound data on the basis of the compressed sound data separated by said demultiplexer; and
   a control section for controlling said optical pickup, said memory means, said video playback means and said audio playback means;
   wherein the identification information stored in said table includes sound identification information for identifying the type of sound data,
   wherein said audio playback means has various audio decoders for playing back the compressed data for various types of sound read out by said optical pickup,
   wherein said optical disc playback apparatus includes a function for selecting an appropriate audio decoder from said various audio decoders in accordance with the type of compressed data read out by said optical pickup, which type is identified by comparing the sound identification information included in the compressed sound data read out by said optical pickup with the sound identification information stored in said table, and
   wherein said control section is equipped with DTS compatibility judging means for judging whether or not the setting function of the apparatus is set in the DTS sound compatible state after starting the playback of the optical disc, Dolby sound selection means for carrying out a control in such a manner that the Dolby sound is compulsively selected when said result of judgment indicates the DTS sound incompatible state, and warning signal generation means for generating a warning signal when said result of judgment indicates the DTS sound incompatible state and
   further wherein the warning signal generation means correlates with an optical disc menu panel.

2. An optical disc playback apparatus having DTS sound incompatible function, said optical disc playback apparatus comprising:
   an optical pickup for reading out compressed data including images and sounds recorded in an optical disc;

a memory means for storing a table of identification information for identifying the type of the compressed data read out by said optical pickup;

a demultiplexer for separating the compressed data read out by said optical pickup into corresponding types of data on the basis of the identification information recorded in said memory means;

video playback means for playing back the image data on the basis of the compressed image data separated by said demultiplexer;

audio playback means for playing back the sound data on the basis of the compressed sound data separated by said demultiplexer; and a control section for controlling said optical pickup, said memory means, said video playback means and said audio playback means;

wherein the identification information stored in said table includes sound identification information for identifying the type of sound data, wherein said audio playback means has various audio decoders for playing back the compressed data for various types of sound other than DTS read out by said optical pickup, wherein said optical disc playback apparatus includes a function for selecting an appropriate audio decoder from said various audio decoders in accordance with the type of compressed data read out by said optical pickup, which type is identified by comparing the sound identification information included in the compressed sound data read out by said optical pickup with the sound identification information stored in said table, wherein said optical disc playback apparatus includes no DTS decoder for playing back the DTS sound, and wherein said control section is equipped with Dolby sound selection means for carrying out a control in such a manner that the Dolby sound is compulsively selected and/or warning signal generation means for generating a warning signal and further wherein the warning signal generation means correlates with an optical disc menu panel.

3. An optical disc playback apparatus comprising: an optical pickup for reading out compressed data including images and sounds recorded in an optical disc; a memory means for storing a table of identification information for identifying the type of the compressed data read out by said optical pickup; a demultiplexer for separating the compressed data read out by said optical pickup into corresponding types of data on the basis of the identification information recorded in said memory means; video playback means for playing back the image data on the basis of the compressed image data separated by said demultiplexer; audio playback means for playing back the sound data on the basis of the compressed sound data separated by said demultiplexer; and a control section for controlling said optical pickup, said memory means, said video playback means and said audio playback means; wherein the identification information stored in said table includes sound identification information for identifying the type of sound data, wherein said audio playback means has various audio decoders for playing back the compressed data for various types of sound read out by said optical pickup, wherein said optical disc playback apparatus includes a function for selecting an appropriate audio decoder from said various audio decoders in accordance with the type of compressed data read out by said optical pickup, which type is identified by comparing the sound identification information included in the compressed sound data read out by said optical pickup with the sound identification information stored in said table, and wherein said control section is equipped with disc menu display means for displaying a disc menu on a display unit when a disc menu selection key is pushed, sound selection information storage means for storing sound selection information indicating a sound selected from said disc menu into said memory means, DTS compatibility judging means for judging whether or not the setting function of the apparatus is set in the DTS sound compatible state when the DTS sound is selected in the disc menu displayed on the display unit, warning signal generation means for generating a warning signal when said result of judgment indicates the DTS incompatible state, DTS sound selection information rewriting means for changing over from the sound selection information stored in said memory means to the sound selection information indicating the DTS sound when said result of judgment indicates the DTS sound compatible state, Dolby sound selection information rewriting means for changing over from the sound selection information stored in said memory means to the sound selection information indicating the Dolby sound when the Dolby sound is selected in the disc menu displayed on said display unit without selecting the DTS sound, LPCM sound selection information rewriting means for changing over from the sound selection information stored in said memory means to the sound selection information indicating the LPCM sound when the LPCM sound is selected in the disc menu displayed on said display unit without selecting the DTS sound, MPEG sound selection information rewriting means for changing over from the sound selection information stored in said memory means to the sound selection information indicating the MPEG sound when the MPEG sound is selected in the disc menu displayed on said display unit without selecting the DTS sound, first sound selection information existence judging means for judging whether or not there is sound selection information in said memory means when the setting function of the apparatus is set in the DTS sound compatible state after starting the main part playback process, first sound selection means for selecting the sound in accordance with the sound selection information stored in said memory means when it is judged that there is the sound selection information in said memory means, second sound selection information existence judging means for judging whether or not there is sound selection information in said memory means when the setting function of the apparatus is set in the DTS sound incompatible state after starting the main part playback process, sound selection judging means for judging whether or not the sound selection information stored in said memory means is the sound selection information indicating the DTS sound when it is judged that there is the sound selection information in said memory means, Dolby sound selection means for carrying out a control in such a manner that the Dolby sound is compulsively selected when it is judged that said sound selection information is the sound selection information indicating the DTS sound, second sound selection means for selecting the sound in accordance with the sound selection information stored in said memory means when it is judged that said sound selection information is not the sound selection information indicating the DTS sound, and main part playback control means for controlling the playback of the main part information either after the Dolby sound is compulsively selected, or after the sound is selected in accordance with the sound selection information stored in said memory means.

* * * * *